Patented July 24, 1951

2,561,483

UNITED STATES PATENT OFFICE 2,561,483

METHOD FOR PREPARING ISOPRENE BY DEHYDRATION OF 1-METHOXY, 3-METHYL, BUTENE-3

Marius Séon, Montreuil-sous-Bois, and Isidor Raitzyn, Belloy, France, assignors to Compagnie de Produits Chimiques et Electrometallurgiques Alais Froges et Camargue, Paris, France, a French society No Drawing. Application June 1, 1949, Serial No. 96,625. In France July 27, 1948

4 Claims. (Cl. 260—681)

This invention relates to the preparation of isoprene.

The provision of a method of preparing isoprene by means of a simple reaction with high yields is highly desirable from a commercial standpoint. A method of preparing isoprene has already been proposed which is based on a thermal decomposition reaction of chloroisoamyl-methyl-ether, which comprises causing the vapors of said ether to pass over a catalyst comprising barium chloride deposited on a suitable support such as silica, heated at about 310° C. The resulting decomposition reaction leads to the simultaneous formation of hydrochloric acid, methyl alcohol and isoprene according to the equation:

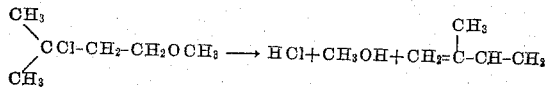

This procedure however has a number of shortcomings. In the first place, the yield in isoprene is not above 70% of the quantitative yield as calculated from the above formula. Then, the catalyst becomes clogged up or obstructed at the end of a short time, and it cannot be subjected to a regeneration treatment by steam and a stream of air more than a given number of times. The resins and other carbonaceous deposits which impregnate the catalyst cause its efficiency to drop off sharply.

The hydrochloric acid and methyl alcohol recombine to a large extent to form unusable methyl chloride and water. In the presence of the water thus formed, the hydrochloric acid causes corrosion, and this poses complicated equipment problems.

Secondary reactions, especially the formation of chlorinated compounds such as 2-chloro-2-methyl-butene-3 cause a reduction in yield and make it difficult to purify the resulting isoprene product.

It is a general object of the invention to eliminate the above shortcomings of prior isoprene production methods of the type described.

It has been stated by applicants in their co-pending U. S. patent application Ser. No. 96,623, filed June 9, 1949, that the reaction occurring when chloro-iso-amyl-methyl ether vapors are passed over barium sulphate as catalyst results in the production of hydrochloric acid and a new product, 1-methoxy, 3-methyl, butene-3, according to the reaction:

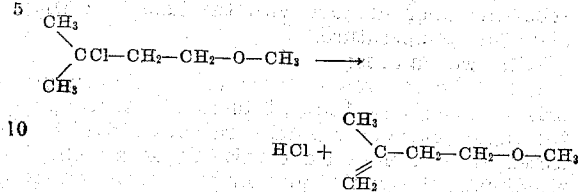

The present invention provides a method of preparing isoprene which consists in passing in the vapor phase, 1-methoxy, 3-methyl, butene-3 over a dehydration catalyst at temperatures within the range of from 220° to 430° C., this step being followed by a condensation of the resulting products and fractional distillation thereof. The reaction of the invention is as follows:

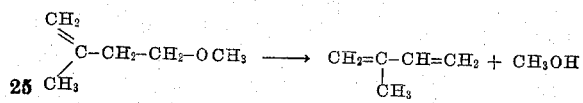

This reaction is carried out in the vapor phase at atmospheric or reduced pressure. In a preferred embodiment of the invention, the reaction is conducted under a vacuum of about 60 to 100 mm. Hg.

The various known dehydration catalysts may be used in connection with the above reaction. Such catalysts may include metal oxides such as alumina, silicates such as aluminum silicate, or mixtures thereof alone or further in admixture with phosphates such as copper phosphate, or sulphates such as magnesium, lead and barium sulphates. Also aluminum phosphate may be used as a catalyst alone.

The method described provides a yield in isoprene closely approaching on the theoretical yield, reaching a value as high as 95 to 98%. The hydrochloric acid formed in the de-hydrochlorination of the chloro-iso-amyl-methyl ether is separated and collected separately, so that due to its absence from the reaction medium corrosion is eliminated. The resulting isoprene is pure and readily polymerizable, the catalyst does not become obstructed and its useful life is considerably lengthened.

Example

γ - Iso - amylene - methyl ether (prepared as afore-described) is delivered through a capillary tube at a rate of 500 grams per hour into a furnace heated at 310° C., and containing 1 liter of a catalyst comprising kaolin with 5% by weight of copper phosphate and maintained under a vacuum of about 60 mm. Hg. The catalyst is employed in the form of small cylinders or rod-like pellets (about 3 mm. in diameter and 10 to 20 mm. long). To obtain the catalyst in this form, the finely pulverised kaolin is diluted in water together with ground copper phosphate; the resulting paste is then extruded through a calibrated tube and is dried in the presence of air at a temperature of 20° C. until it has set. The electrically heated furnace is slightly inclined with respect to a horizontal plane and the γ-iso-amylène-methyl ether is delivered into the top thereof. The gases discharged from the furnace are dried in a drying column provided with an anhydrous calcium chloride filling and are then condensed in a container cooled with liquid air and are subjected to fractional distillation.

A theoretical yield is thus collected of isoprene and methyl oxide, which last-named compound results from the secondary reaction $$2 CH_3OH \rightarrow CH_3OCH_3 + H_2O$$

occurring upon contact with the kaolin at the operating temperature.

What we claim is:

1. Method of preparing isoprene which comprises passing 1-methoxy, 3-methyl, butene-3 in the vapor phase over a dehydration catalyst selected from the group consisting of alumina, aluminum phosphate, aluminum silicates, and mixtures of aluminum silicates with metal phosphates and metal sulphates, at a temperature within the range of from about 220° C. to about 430° C., condensing the reaction product and subjecting the condensate to fractional distillation.

2. Method of preparing isoprene as in claim 1, wherein said reaction is operated in vacuo at a pressure within the range of about 60 to 100 mm. Hg.

3. Method of preparing isoprene which comprises passing 1-methoxy, 3-methyl, butene-3 in the vapor phase over a dehydration catalyst comprising kaolin containing 5% by weight of copper phosphate therein, at a temperature of about 310° C. and at a reduced pressure of about 60 mm. Hg., condensing the reaction products and subjecting the condensate to fractional distillation.

4. Method as in claim 3 wherein said catalyst is in the form of rodlike pellets.

MARIUS SÉON.
ISIDOR RAITZYN.

REFERENCES CITED

The following references are of record in the file of this patent:

UNITED STATES PATENTS

| Number | Name | Date |
| --- | --- | --- |
| 2,427,704 | Bludworth et al. | Sept. 23, 1947 |

FOREIGN PATENTS

| Number | Country | Date |
| --- | --- | --- |
| 8,782 | Great Britain | Jan. 15, 1914 |
| (Addition to 13,327/13) | | |

OTHER REFERENCES

Egloff et al.: "Methods of Preparing Butadiene," Oil and Gas Journal, December 17, 1942, pages 36–37.